(12) United States Patent
Hyslop et al.

(10) Patent No.: US 7,481,401 B2
(45) Date of Patent: Jan. 27, 2009

(54) TUBE ASSEMBLY ONE PIECE BRACKET

(75) Inventors: C. Renee Hyslop, Morristown, TN (US); Eric A. Roline, Morristown, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 358 days.

(21) Appl. No.: 11/209,840

(22) Filed: Aug. 23, 2005

(65) Prior Publication Data

US 2007/0051860 A1    Mar. 8, 2007

(51) Int. Cl.
F16L 3/08    (2006.01)
B62D 5/06    (2006.01)

(52) U.S. Cl. ........................ 248/65; 248/230.1; 180/428

(58) Field of Classification Search .............. 248/230.1, 248/230.7, 230.9, 230.8, 65, 68.1, 74.1; 180/427, 180/428, 400; 403/234, 398
See application file for complete search history.

(56) References Cited

U.S. PATENT DOCUMENTS

| | | | | |
|---|---|---|---|---|
| 313,305 | A | * | 3/1885 | Eckert et al. ................... 174/32 |
| 4,078,772 | A | * | 3/1978 | Carbone ....................... 256/24 |
| 4,177,034 | A | * | 12/1979 | Jones .......................... 248/65 |
| 4,899,991 | A | * | 2/1990 | Brunkan ....................... 256/24 |
| 5,259,646 | A | | 11/1993 | Snyder |
| 5,297,890 | A | * | 3/1994 | Commins ................... 248/74.1 |
| 5,961,242 | A | * | 10/1999 | Leone ..................... 248/230.1 |
| 6,056,085 | A | * | 5/2000 | Cutter et al. ................... 182/36 |
| 6,086,075 | A | | 7/2000 | O'Bryan et al. |
| 6,283,244 | B1 | * | 9/2001 | Ballester ..................... 180/428 |
| 6,397,970 | B1 | | 6/2002 | Williams |
| 6,511,249 | B2 | | 1/2003 | Plofi et al. |
| 6,533,230 | B2 | | 3/2003 | Fullenkamp et al. |
| 6,684,727 | B2 | | 2/2004 | Krause |
| 6,722,465 | B2 | * | 4/2004 | Ballester ..................... 180/428 |
| 7,178,777 | B1 | * | 2/2007 | Banker ..................... 248/316.7 |
| 2007/0051860 | A1 | * | 3/2007 | Hyslop et al. ............ 248/230.1 |

FOREIGN PATENT DOCUMENTS

EP    0561403    9/1993
GB    2154299    9/1985

* cited by examiner

Primary Examiner—J. Allen Shriver
Assistant Examiner—Tan Le
(74) Attorney, Agent, or Firm—MacMillan, Sobanski & Todd, LLC (57) ABSTRACT

A one-piece bracket is provided for mounting a tubular housing of a steering gear tube assembly to a vehicle member. At least one folded portion forming at least one receiving member is adapted for receiving a fastening member therethrough that couples the bracket to the vehicle member. A first leg portion is integral with and extends from the first folded portion. The first leg portion is contoured for being adapted to be coupled to the tubular housing. A second leg portion is integral with and extends from the first folded portion. The second leg portion is contoured for being adapted to be coupled to the tubular housing. The first and second leg portions are spaced apart a predetermined distance defining an opening therebetween for receiving the tubular housing.

23 Claims, 8 Drawing Sheets

TUBE ASSEMBLY ONE PIECE BRACKET

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This present invention relates to a support bracket for a steering gear tube assembly, and more specifically, to a one piece formed bracket of a steering gear tube assembly.

2. Description of the Related Art

Steering systems in motor vehicles typically comprise rack and pinion steering systems. The rack and pinion steering systems consist of a pinion shaft, pinion teeth, a rack including rack teeth, bearings, seals, and a housing. The housing has a hydraulic valve section and an extended rack section and houses the meshing of the pinion teeth and the rack teeth. The housing is commonly supported by one or more mounting brackets. The mounting brackets are coupled to the housing and are bolted to a vehicle frame or a unibody structure. Rubber grommets or bushings are used to dampen noise and vibrations from the road.

The mounting brackets are typically spot welded to or strapped about the housing. The welded mounting brackets include two or more stamped metal parts that are welded together to form a unified bracket. The process for manufacturing a mounting bracket may include multiple manufacturing operations such as stamping, forming, and welding operations to form the unified bracket.

SUMMARY OF THE INVENTION

The present invention has the advantage of utilizing a one piece bracket formed from a single piece of material for mounting a tube and bracket assembly of a rack and pinion steering system that requires no welding operation to form the mounting bracket. By employing a single piece of material to form the bracket, the number of components required for assembling the bracket assembly is reduced in addition to a reduced number of assembly steps.

In one aspect of the present invention, a one-piece bracket is provided for mounting a tubular housing of a steering gear tube assembly to a vehicle member. At least one folded portion forming at least one receiving member is adapted for receiving a fastening member therethrough that couples the bracket to the vehicle member. A first leg portion is integral with and extends from the first folded portion. The first leg portion is contoured for being adapted to be coupled to the tubular housing. A second leg portion is integral with and extends from the first folded portion. The second leg portion is contoured for being adapted to be coupled to the tubular housing. The first and second leg portions are spaced apart a predetermined distance defining an opening therebetween for receiving the tubular housing.

DETAILED DESCRIPTION OF PREFERRED EMBODIMENTS

Figure 1:
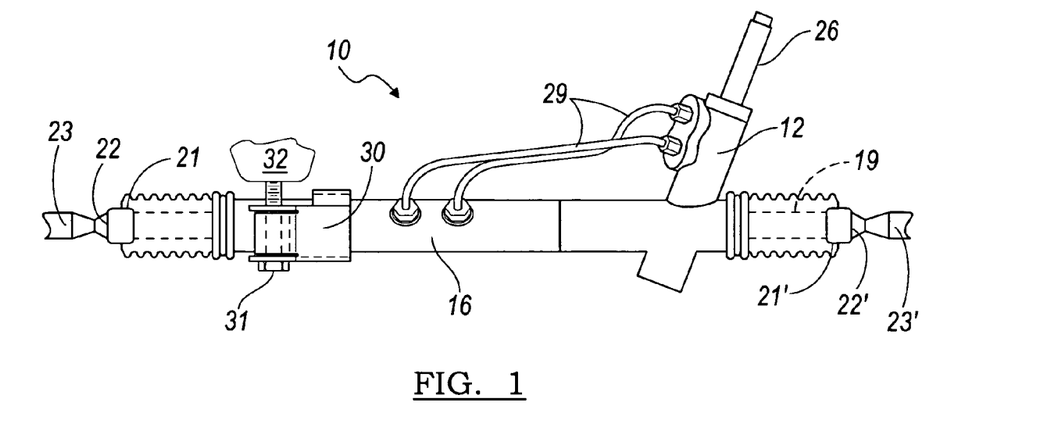
FIG. 1 is a schematic illustration of a tube and bracket assembly for a rack and pinion steering system of a vehicle according to a preferred embodiment of the present invention.

There is shown in FIG. 1 a schematic illustration of a tube and bracket assembly, indicated generally at 10, for a rack and pinion steering system of a vehicle (not shown) according to a first preferred embodiment of the present invention. The tube and bracket assembly 10 includes a pinion housing 12, a tubular housing 16, and an input shaft 26. The tubular housing 16 includes a rack 19 having gear teeth (not shown). The pinion housing 12 houses the input shaft 26 and a pinion gear having gear teeth (not shown). The pinion housing 12 also houses the interconnection between the gear teeth of the rack 19 and the pinion gear teeth. As the input shaft 26 is rotationally displaced within the pinion housing 12, the pinion gear teeth mesh with the rack gear teeth thereby causing the rack 19 within the tubular housing 16 to move laterally.

The pinion housing 12 includes a set of hydraulic lines 29 for transferring hydraulic steering fluid between the tubular housing 16 and a power steering pump (not shown). The hydraulic steering fluid communicated between the tubular housing 16 and the power steering pump reduces the effort level of turning a steering wheel (not shown).

The opposite ends of the rack 19 include sockets 21, 21' for receiving balls 22, 22'. The sockets 21, 21' and the balls 22, 22' are coupled to form ball and socket joints for pivotably connecting tie rods 23, 23' to the rack 19. The tie rods 23, 23' are connected to steerable vehicle wheels (not shown). A mounting bracket 30 is affixed to the tubular housing 16 for securing the tube and bracket assembly 10 to a frame of the vehicle 32. The mounting bracket 30 rigidly secures the tube and bracket assembly 10 to the vehicle member 32 such as a vehicle frame or unibody via a fastening member 31 while internal components within the tubular housing 16 are allowed to move laterally for pivotably steering the vehicle wheels.

Figure 2:
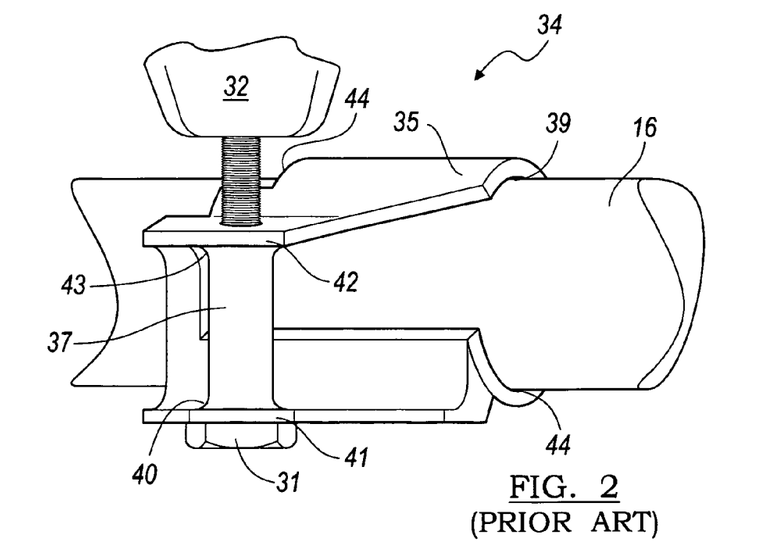
FIG. 2 is an elevation view of a portion of a prior art tube and bracket assembly.

FIG. 2 illustrates a portion of a typical prior art tube and bracket assembly 34. A mounting bracket 35 is permanently affixed to tubular housing 16. The mounting bracket 35 includes a semi-circular body portion 38 which abuts a substantial portion of the outer surface of the tubular member 36 (e.g. 180 degrees). The mounting bracket 35 is permanently affixed to the tubular member 36 by welding end portions 39 and 44 of the mounting bracket 35 to the substantial portion of the outer surface of the tubular member 36.

The mounting bracket 35 includes a first tab member 41 and a second tab member 42. The first tab member 41 and the second tab member 42 each includes an aperture (not shown). The apertures of the first and second tab members 41 and 42 are axially aligned for receiving a fastening member 31 such as a bolt therethrough for securing the tube and bracket assembly 34 to a vehicle frame 32.

A tubular support member 37 is a separately formed cylindrical bore member that is affixed (i.e., welded) between the first and second tab members 41 and 42 with its bore axially aligned with each aperture of the first and second tab members 41 and 42. The tubular support member 37 is permanently affixed to the first and second tab member 41 and 42 by welding the end portions 40 and 43 of the tubular support member 37 to the first and second tab members 41 and 42, respectively. The tubular support member 37 provides structural support and prevents the first and second tab members 41 and 42 from collapsing as a respective fastener is inserted through each aperture and fastened to the frame of the vehicle 32 or unibody.

Figure 3:
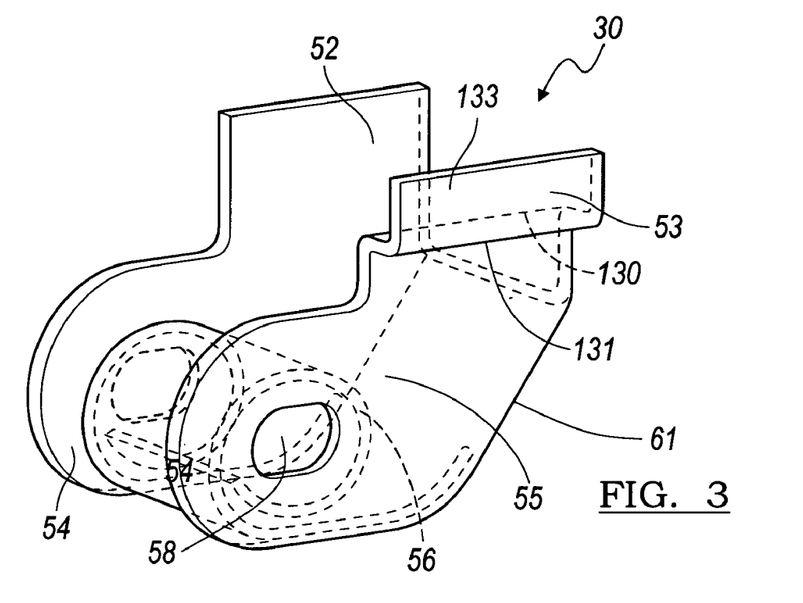
FIG. 3 is a perspective view of a mounting bracket according to the first preferred embodiment of the present invention.

FIG. 3 illustrates the first preferred embodiment of a mounting bracket 30 according to the present invention. The mounting bracket 30 includes a first leg portion 52 and a second leg portion 53 that are formed for attaching to the outer surface of the tubular housing 16 (shown in FIG. 1). The mounting bracket 30 further includes a first tab member 54, a second tab member 55, and a tubular sleeve 56. The first and second tab members 54 and 55 include apertures 57 (shown in FIG. 4) and 58 that are axially aligned with the bore of the tubular sleeve 56 for receiving a fastening member 31 (shown in FIG. 1) for securing the mounting bracket 30 and tubular housing 16 to a vehicle frame 32. The tubular sleeve 56 provides structural support and prevents the first and second tab members 54 and 55 from collapsing when a fastening member 31 is inserted therethrough and fastened to the vehicle frame 32. The mounting bracket 30 also includes a main body portion 61 that integrally interconnects the tubular sleeve 56, the first and second leg portions 52 and 53, and the first and second tab members 54 and 55.

Figure 4:
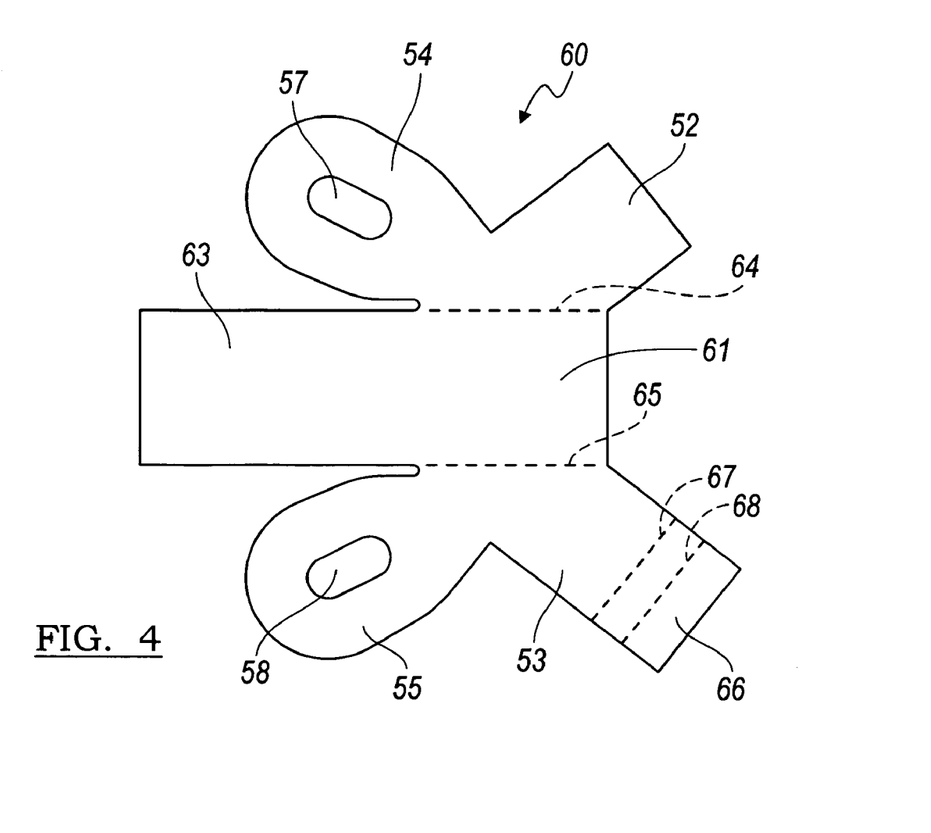
FIG. 4 is a plan view of a blank used for forming the mounting bracket of FIG. 3 according to the first preferred embodiment of the present invention.
Figure 7:
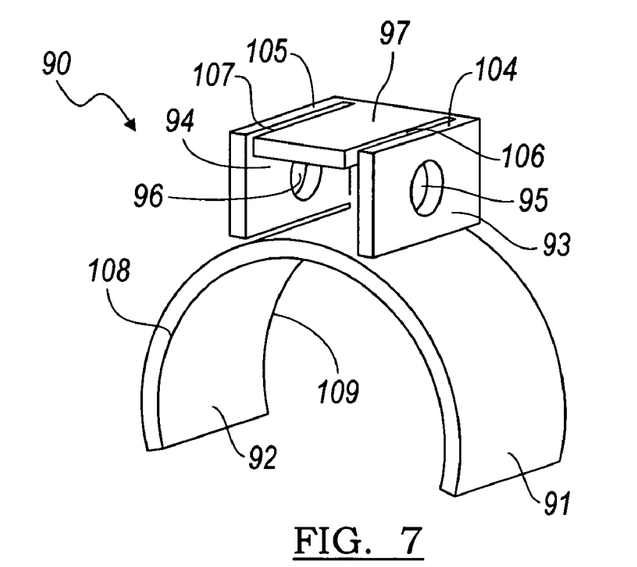
FIG. 7 is a perspective view of a mounting bracket according to a third preferred embodiment of the present invention.

A stamped one-piece integral metal blank 60 shown in FIG. 4, is used to form the mounting bracket 30, shown in FIG. 7. The one-piece blank 60 includes the main body portion 61, the first leg portion 52, the second leg portion 53, a third leg portion 63, the first tab member 54, and the second tab member 55. Both the first leg portion 52 and the second leg portion 53 angularly extend from the main body portion 61.

The first tab member 54 and the second tab member 55 also angularly extend from the main body portion 61 and are symmetrical to one another. Both the first tab member 54 and the second tab member 55 include apertures 57 and 58, respectively. The third leg portion 63 extends laterally from the main body portion 61 and is disposed an equal distance between the first tab member 54 and the second tab member 55. Preferably, the one-piece blank 60 and the apertures 57 and 58 are formed during a one-step processing operation. Alternatively, the one-piece metal blank 60 may be formed initially and apertures 57 and 58 may be stamped thereafter.

FIG. 3 illustrates the mounting bracket 30 formed from the one-piece integral blank 60, shown in FIG. 4, into a final shape without utilizing any welding operations. The term one-piece and/or integral, as used herein and for all other embodiments, means the bracket, with all of its features is formed from a single piece of material. The forming operation preferably begins with the single flat piece of material prior to bending the material to create the features of the mounting bracket 30. To form the mounting bracket 30, the third leg portion 63 is folded to form the tubular sleeve 56 for receiving a fastener shaft (not shown) such as a bolt shaft for fastening to a vehicle frame 32 or unibody. The first leg portion 52 and first tab member 54 and the second leg portion 53 and second tab member 55 are folded along fold lines 64 and 65, respectively, until the first tab member 54 and second tab member 55 each abut a respective end surface of the tubular sleeve 56.

When the first tab member 54 and the second tab member 55 abut the respective end surfaces of the tubular sleeve 56, apertures 57 and 58 axially align with the bore of the tubular sleeve 56. The tubular sleeve 56 prevents the first tab member 54 and the second tab member 55 from collapsing as a respective fastener is inserted through tubular sleeve 56 and apertures 57 and 58 for securing the bracket 30 and tubular housing 16 (as shown in FIG. 1) to the vehicle frame 32 or unibody.

A first end portion 66 of the second portion 53 is bent at fold lines 67 and 68 for contouring the second leg portion 53 to the outer surface of the tubular housing 16. Alternatively, the first leg portion 52 may be bent at an end portion for contouring to the outer surface of the tubular housing 16. The mounting bracket 30 is thereafter welded to the tubular housing 16 along the contacting locations of the first and second legs 52, 53.

Figure 5:
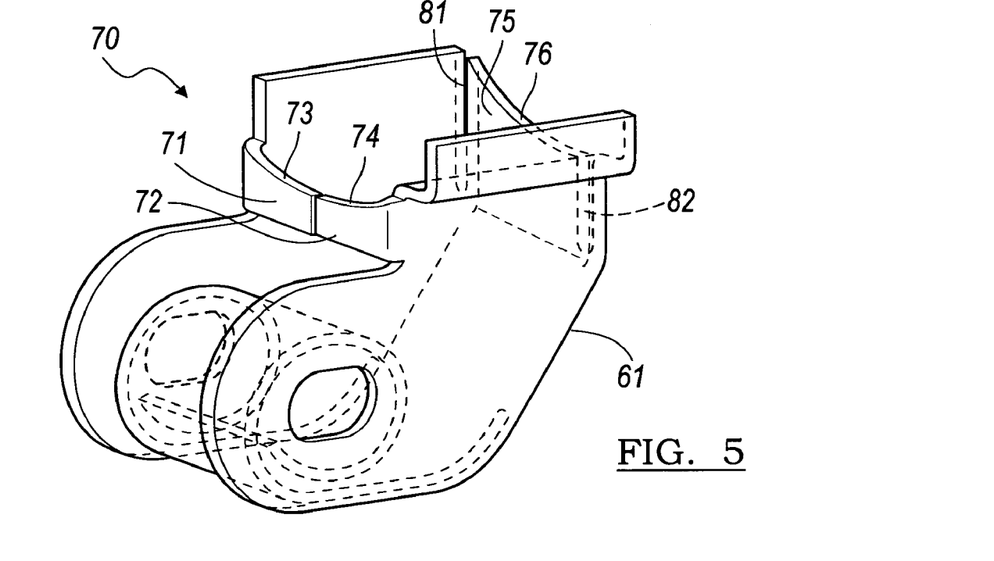
FIG. 5 is a perspective view of a mounting bracket according to a second preferred embodiment of the present invention.

Referring now to FIG. 5 and using like reference numbers to indicate corresponding parts, there is illustrated a mounting bracket 70 according to a second preferred embodiment of the present invention. The mounting bracket 70 can be used in place of mounting bracket 30 in FIG. 1. The mounting bracket 70 includes a first support member 71 and a second support member 72. The first support member 71 is integral and perpendicular to the first tab member 54. The second support member 72 is integral and perpendicular to the second tab member 55. The first support member 71 includes a top portion 73 that is curved and the second support member 72 includes a top portion 74 that is curved. The first support member 71 and the second support member 72 are substantially planar to one another.

The mounting bracket 70 further includes a third support member 75 integrally formed and extending from the main body portion 61. A top portion 76 of the third support member 75 is curved.

Figure 6:
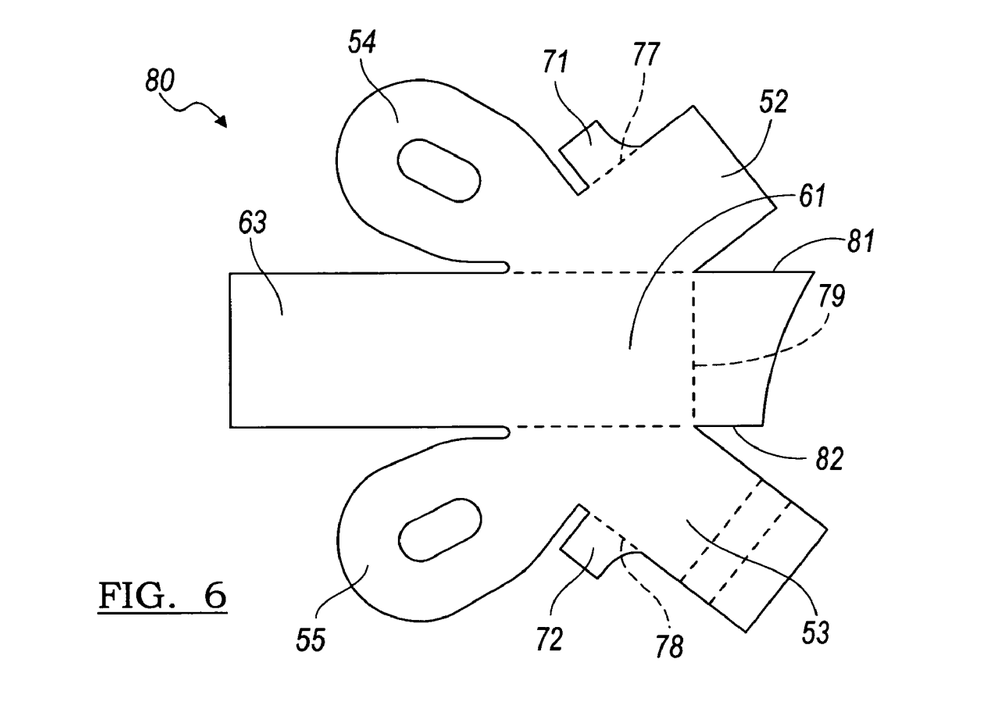
FIG. 6 is a plan view of a blank used for forming the mounting bracket of FIG. 5 according to the second preferred embodiment of the present invention.

A stamped one-piece integral metal blank 80 shown in FIG. 6 is used to form the mounting bracket 70, shown in FIG. 5. The one-piece blank 80 includes the main body portion 61, the first leg portion 52, the second leg portion 53, the third leg portion 63, the first tab member 54, and the second tab member 55. The first support member 71 is integrally formed with the first leg portion 52 and extends laterally from the first leg portion 52. The second support member 72 is integrally formed with the second leg portion 53 and extends laterally from the first leg portion 53. The third support member 75 is integrally formed with the main body portion 61. The third support member 75 extends laterally from the main body portion 61 and is disposed an equal distance between the first leg portion 52 and the second leg portion 53.

FIG. 5 illustrates the mounting bracket 70 formed from the one-piece integral blank 80, shown in FIG. 6, into a final shape without utilizing any welding operations. The formed mounting bracket 70 is the same as that described in the embodiment of FIG. 3 with the following additions. The first and second support member 71 and 72 are folded along fold lines 77 and 78, respectively, to substantially 90 degrees such that the first and second support member 71 and 72 are substantially planar to one another. The top portions 73 and 74 cooperatively form a continuous contoured edge surface for receiving and supporting the tubular member 16 (shown in FIG. 1).

The third support member 75 is folded along fold line 79 until a first side 81 and a second side 82 of the third support member 75 are perpendicular to the first leg portion 52 and the second leg portion 53, respectively. The top portion 76 includes a contoured edge surface for receiving and supporting the tubular member 16. The first leg portion 52 and the second leg portion 53 along with the first support member 71, second support members 72, and third support member 75 cooperatively box in a surface area of the tubular member 16 for providing added support strength to the mounting bracket 70.

FIG. 7 illustrates a third preferred embodiment of a mounting bracket 90 according to the present invention. The mounting bracket 90 can be used in place of mounting bracket 30 in FIG. 1. The mounting bracket 90 includes a first leg portion 91 and a second leg portion 92 that are contoured for attaching to the outer surface of the tubular housing 16 (shown in FIG. 1). The mounting bracket 90 further includes a first tab member 93 and a second tab member 94 that have apertures 95 and 96, respectively, for receiving a respective fastener for securing the mounting bracket 90 and tubular housing 16 to a vehicle frame 32 or unibody. The first tab member 93 extends along an outer surface the first leg portion 91 in spaced relation to the second tab member 94 which extends along the outer surface of the second leg portion 92. The first tab member 93 and the second tab member 94 are substantially parallel to one another. A third leg portion 97 is disposed between the first and second tab members 93 and 94 for providing support and preventing the first and second tab members 93 and 94 from collapsing as a respective fastening member 31 is inserted therethrough and secured to the vehicle frame 32. A main body portion 98 (shown in FIG. 8) interconnects the first leg portion 91, the second leg portion 92, the third leg portion 97, the first tab member 93, and the second tab member 94.

Figure 8:
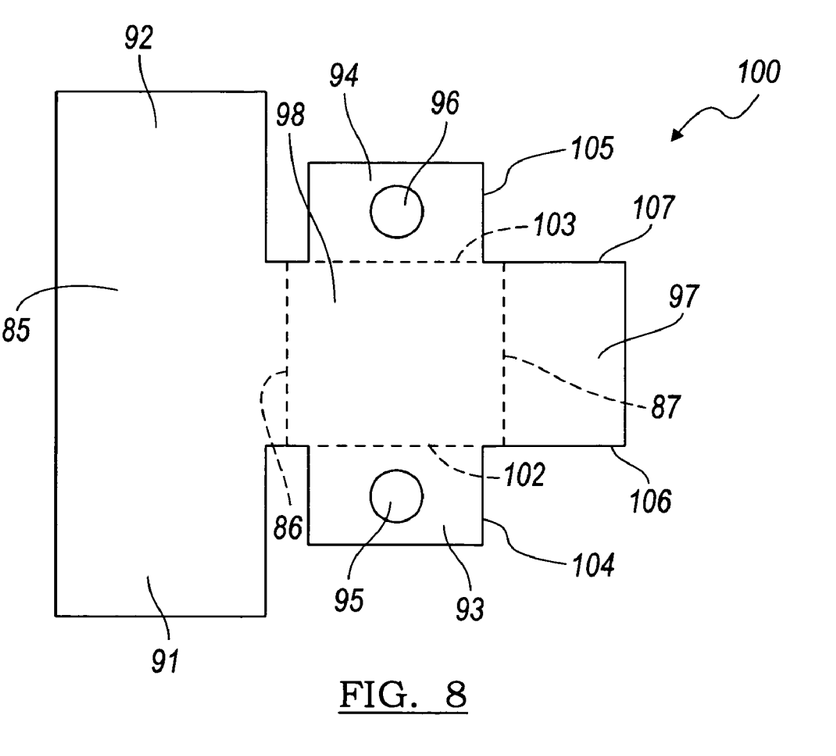
FIG. 8 is a plan view of a blank used for forming the mounting bracket of FIG. 7 according to the third preferred embodiment of the present invention.

A stamped one-piece integral metal blank 100, shown in FIG. 8, is used to form the bracket 90, shown in FIG. 7. The one-piece blank 100 includes the first leg portion 91, the second leg portion 92, the third leg portion 97, the first tab member 93, the second tab member 94, and the main body portion 98. The first tab member 93 and the second tab member 94 extend outwardly from the main body portion 98 and are substantially symmetrical to one another. The first leg portion 91 and the second leg portion 92 also extend laterally outward from one another and are substantially symmetrical to one another.

FIG. 7 illustrates the mounting bracket 90 formed from the one-piece integral blank 100, shown in FIG. 8, into the final shape without utilizing any welding operations. To form the mounting bracket 90, the main body portion 85 is folded along a fold line 86 to substantially 90 degrees. The third leg portion 97 is folded along a fold line 87 to substantially 90 degrees. Both the first and second tab members 93 and 94 are folded along fold lines 102 and 103, respectively, until a tab edge 104 and a tab edge 105 abut edges 106 and 107, respectively, of the third end portion 97. When the first tab member 93 and the second tab member 94 abut the third leg portion 97, apertures 95 and 96 are axially aligned with one another for receiving a fastener (not shown) for attachment to a vehicle frame 32 or unibody. The third leg portion 97 disposed between the first and second tab members 93 and 94, provides structural support for preventing the first and second tab members 93 and 94 from collapsing as the fastener is mounted through each aperture and fastened to the frame of the vehicle 32.

The first leg portion 91 and the second leg portion 92 include end portions that are bent to form a substantially semi-circular mounting surface. The combined shape of the first leg portion 91 and the second leg portion 92 form the substantially semi-circular mounting surface that conforms to the outer surface of the tubular housing 16. The mounting bracket 90 is thereafter welded to the tubular housing 16 along edges 108 and 109 of the substantially semi-circular mounting surface.

Figure 9:
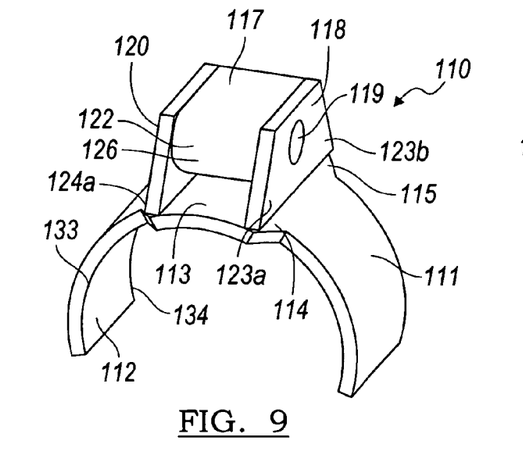
FIG. 9 is a perspective view of a mounting bracket according to a fourth preferred embodiment of the present invention.
Figure 10:
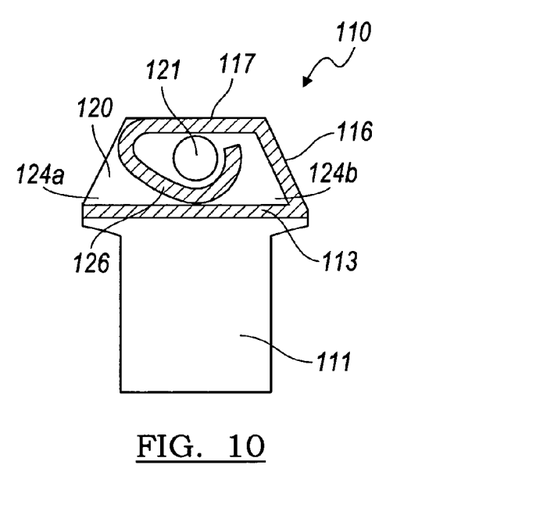
FIG. 10 is a cross sectional view of a mounting bracket according to the fourth preferred embodiment of the present invention.

Referring now to FIG. 9 and FIG. 10 there is illustrated a mounting bracket 110 according to a fourth preferred embodiment of the present invention. The mounting bracket 110 can be used in place of mounting bracket 30 in FIG. 1. The mounting bracket 110 includes a first leg portion 111 and a second leg portion 112 that are contoured for attaching to the outer surface of the tubular housing 16 (shown in FIG. 1). The mounting bracket 110 further includes a main body portion 113 having a first flared support region 114 and a second flared support region 115. The main body portion 113 is integral to the first and second leg portions 111 and 112. A rear tab member 116 is formed integral to the main body portion 113. A top tab member 117 is integrally formed to the rear tab member 116. A first tab member 118 and a second tab member 120 are integrally formed to respective sides of the top tab member 117. The first tab member 118 and the second tab member 120 are preferably trapezoidal shaped and are substantially parallel to one another. The first tab member 118 includes an aperture 119 and the second tab member 120 includes an aperture 121 for receiving a fastener (not shown) therethrough. A third leg member 122 is disposed between the first and second tab members 118 and 120 and forms a sleeve 126 therebetween. The first tab member 118 includes tab support members 123a and 123b. The second tab member 120 includes tab support members 124a and 124b.

Figure 11:
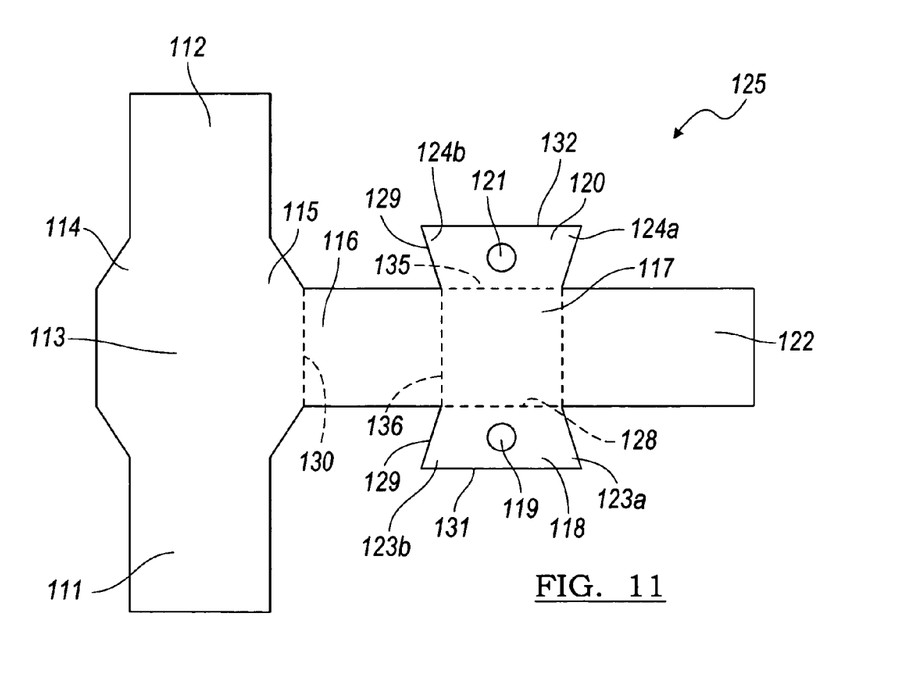
FIG. 11 is a plan view of a blank used for forming the mounting bracket of FIG. 9 according to the fourth preferred embodiment of the present invention.

A stamped one-piece integral metal blank 125, shown in FIG. 11, is used to form the bracket 110, shown in FIGS. 9 and 10. The one-piece blank 125 includes the main body portion 113, the first leg portion 111, the second leg portion 112, the third leg portion 122, the first tab member 118, the second tab member 120, the rear tab member 116 and the top tab member 117. The first leg portion 111 and the second leg portion 112 extend outwardly from the main body portion 113. The main body portion 113 includes the flared support regions 114 and 115 in opposing directions from one another.

The rear tab member 116 extends laterally from the second flared support region 115 of the main body portion 113. A top portion extends laterally outward from rear tab member 116. The first tab member 118 and the second tab member 120 extend laterally outward from the top tab member 117 in opposing directions. The first tab member 118 and the second tab member 120 are substantially symmetrical to one another. The first tab member 118 includes the aperture 119 and the second tab member 120 includes the aperture 121. Preferably, the one-piece blank 125, including the apertures 119 and 121, is formed during a one-step processing operation. Alternatively, the one-piece blank 125 may be initially formed and apertures 119 and 121 may be stamped thereafter.

FIG. 9 and FIG. 10 illustrates the mounting bracket 110 formed from the one-piece integral blank 125, shown in FIG. 11, into the final shape without utilizing any welding operations. To form the mounting bracket 110, the third leg 122 is folded to form the tubular sleeve 126 for receiving a fastener shaft (not shown) such as a bolt shaft for attaching to a vehicle frame 32 or unibody. The first and second tab members 118 and 120 are folded along fold line 127 and fold line 128 until the first and second tab member 118 and 120 each abut a respective end of the sleeve. The top tab member 117 is folded along fold line 136 until an edge surface 129 of the first tab member 118 and an edge surface 135 of the second tab member 120 abut the rear tab member 116. The rear tab member 116 is bent along fold line 130 until a bottom edge surface 131 of the first tab member 118 and a bottom edge surface 132 of the second tab member 120 abuts the main body portion 113. A trapezoidal shaped open-ended box is thereafter formed about the sleeve member 126.

The first leg portion 111 and the second leg portion 112 include end portions that are bent to form a substantially semi-circular mounting surface. The combined shape of the first leg portion 111 and the second leg portion 112 in cooperation with the main body portion 113 form the substantially semi-circular mounting surface that conforms to the outer surface of the tubular housing 16.

The mounting bracket 110 is thereafter welded to the tubular housing 16 (shown in FIG. 1) along edges 133 and 134 of the substantially semi-circular mounting surface.

Figures 12, 13, 14, 15:
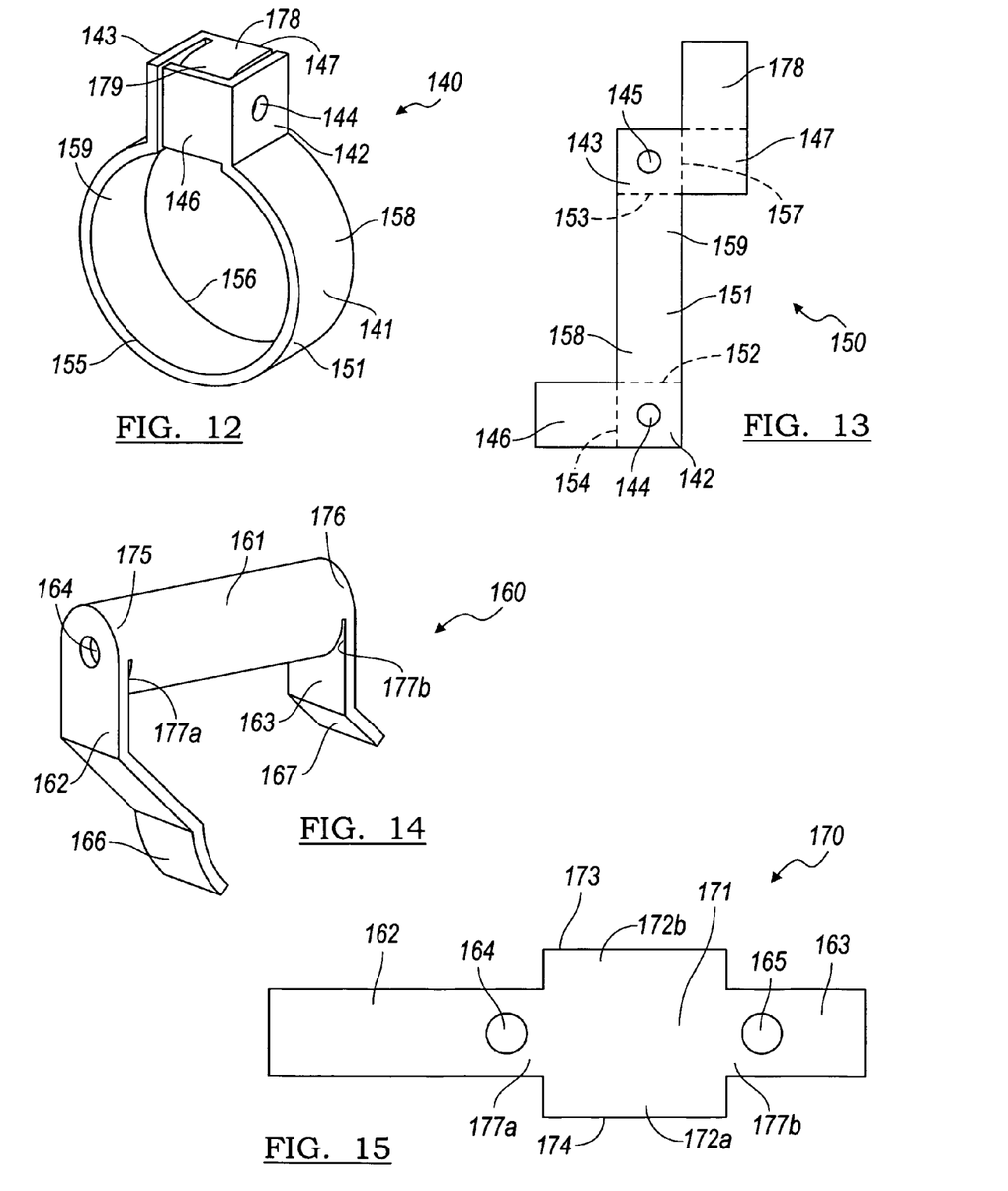
FIG. 12 is a perspective view of a mounting bracket according to a fifth preferred embodiment of the present invention.
FIG. 13 is a plan view of a blank used for forming the mounting bracket of FIG. 12 according to the fifth preferred embodiment of the present invention.
FIG. 14 is a perspective view of a mounting bracket according to a sixth preferred embodiment of the present invention.
FIG. 15 is a plan view of a blank used for forming the mounting bracket of FIG. 14 according to the sixth preferred embodiment of the present invention.

FIG. 12 illustrates a fifth preferred embodiment of a mounting bracket 140. The mounting bracket 140 can be used in place of mounting bracket 30 in FIG. 1. The mounting bracket 140 includes a main body portion 151 having a first leg portion 158 and a second leg portion 159 that forms a substantially circular sleeve 141 for receiving the tubular member 16 (shown in FIG. 1). The mounting bracket 140 includes a first tab member 142 extending from the first leg portion 158 that is in spaced relation to a second tab member 143 extending from the second leg portion 159. The first and second tab members 142 and 143 are substantially parallel to one another. A third leg portion 178 extends from the second tab member 143 for forming a tubular sleeve 179. The tubular sleeve 179 is disposed between the first and second tab members 142 and 143.

The first and second tab members 142 and 143 include apertures 144 and 145 (shown in FIG. 13). The apertures 144 and 145 are axially aligned with the tubular sleeve 179 for receiving a respective fastening member 31 for fastening the mounting bracket 140 and tubular housing 16 to a vehicle frame 32 or unibody. The mounting bracket 140 includes a first extended portion 146 and a second extended portion 147 (shown in FIG. 13) that are each respectively disposed between the first and second tab members 142 and 143. The first and second extended portions 146 and 147 in cooperation with the tubular sleeve 179 provide structural support as the respective fastener is inserted through the apertures 144 and 145 and secured to the vehicle frame 32.

A stamped one-piece integral metal blank 150, shown in FIG. 13, is used to form the mounting bracket 140, shown in FIG. 12. The one-piece blank 150 includes a main body portion 151 that has the first leg portion 158 and the second leg portion 159 integrally formed to the main body portion 151 and extending in opposite directions therefrom. The first tab member 142 extends from the first leg portion 158 and the second tab member 143 extends from the second leg portion 159. Both the first tab member 142 and the second tab member 143 include apertures 144 and 145, respectively. The first extended portion 146 extends laterally from the first leg portion 158 and the second extended portion 147 extends laterally from the second leg portion 159. A third leg portion 178 extends laterally from the second extended portion 147.

To form the mounting bracket 140 shown in FIG. 12, the third leg portion 178 is bent to form the tubular sleeve 179. The first tab member 142 and second tab member 143 are folded along fold lines 152 and 153, respectively, to substantially 90 degrees with respect to the first and second leg portions 158 and 159, respectively. The first and second leg portions 158 and 159 are circularly bent until apertures 144 and 145 are axially aligned. The substantially circular sleeve 141 is formed for receiving and conforming to an outer surface of the tubular housing 16.

The first extended portion 146 is folded along fold line 154 until the first extended portion 146 is substantially 90 degrees to the first tab member 142. Similarly, the second extended portion 147 is folded along fold line 157 until the second extended portion 147 is substantially 90 degrees to the first tab member 143. The first and second extended portions 146 and 147 in cooperation with the tubular sleeve 179 are support members that add structural support for preventing the first and second tab members 142 and 143 from collapsing as the fastener is mounted through each aperture and fastened to the frame of the vehicle 32. The mounting bracket 140 may be welded to the outer surface of the tubular member (not shown) along edge surfaces 155 and 156 of the substantially circular sleeve 141 for preventing rotation of the tubular member 16 relative to the mounting bracket 140.

FIG. 14 illustrates a sixth preferred embodiment of the mounting bracket 160 according to the present invention. The mounting bracket 160 can be used in place of mounting bracket 30 in FIG. 1. The mounting bracket 160 includes a tubular sleeve 161 that is integrally formed between a first leg portion 162 and a second leg portion 163. The first and second leg portion 162 and 163 include apertures 164 and 165 (shown in FIG. 15), respectively, that are axially aligned with the centerline of the tubular sleeve 161. The first and second leg portions 162 and 163 extend radially outward from the centerline of the tubular sleeve 161 for attachment to the tubular member 16 (shown in FIG. 1). A first end portion 166 of the first leg portion 162 and a second end portion 167 of the second leg portion 163 are angled to accommodate the contour of an outer surface (i.e., profile) of the tubular member 16 (shown in FIG. 1).

A stamped one-piece integral metal blank 170, as shown in FIG. 15, is used to form the mounting bracket 160 as shown in FIG. 14. The one-piece blank 170 includes a main body portion 171 having the first leg portion 162 and the second leg portion 163 extending outwardly from opposing sides of the main body portion 171. The first leg portion 162 is asymmetrical to the second leg portion 163. The first leg portion 162 and the second leg portion 163 include apertures 164 and 165, respectively. The main body portion 171 includes opposed ends 172a and 172b that are symmetrical to one another. Preferably, the one-piece blank 170, including the apertures 164 and 165 is formed during a one-step processing operation. Alternatively, the one-piece blank 170 may be initially formed and apertures 164 and 165 may be stamped thereafter.

Referring now to FIG. 14 with reference to FIG. 15, the mounting bracket 160 is formed from the one-piece integral blank 170 shown in FIG. 15. To form the mounting bracket 160, opposed ends 172a and 172b of the main body portion 171 are folded in a generally circular manner and adjoined at edges 173 and 174 to form the tubular sleeve 161. Alternatively, a single end having a respective length could be used to form a tubular sleeve. The first leg portion 162 and the second leg portion 163 include abutment surfaces 177a and 177b, respectively, for abutting tubular sleeve ends 175 and 176. The first and second leg portions 162 and 163 are folded at substantially right angles to the main body portion 171 until abutment surfaces 177a and 177b abut tubular ends 175 and 176, respectively. When the abutment surfaces 177a and 177b are in contact with tubular ends 175 and 176, respectively, apertures 164 and 165 are axially aligned with the bore of the tubular sleeve 161.

The first leg portion 162 includes the first end portion 166 that is offset for contouring the first leg portion 162 to the outer surface of the tubular housing 16. Similarly, second leg portion 163 includes the second end portion 167 that is offset for contouring the second leg portion 163 to the outer surface of the tubular housing 16. In addition, both the first leg portion 162 and the second leg portion 163 may each be offset at more than one location along each respective leg for contouring or fitting each leg to the outer surface of the tubular housing 16. To secure the bracket 160 to the tubular member 16, the first and second end portions 166 and 167 are welded to the tubular member.

Figure 16:
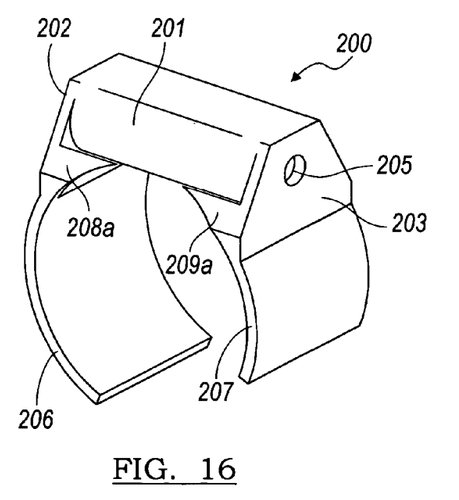
FIG. 16 is a perspective view of a mounting bracket according to a seventh preferred embodiment of the present invention.
Figure 17:
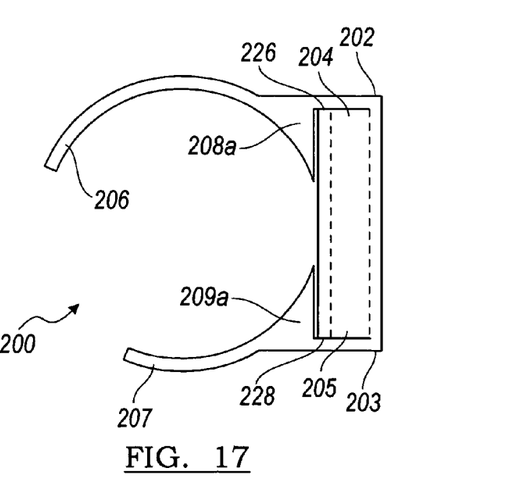
FIG. 17 is a cross sectional view of a mounting bracket according to the seventh preferred embodiment of the present invention.

FIGS. 16 and 17 illustrate a seventh preferred embodiment of the mounting bracket 200 according to the present invention. The mounting bracket 200 can be used in place of mounting bracket 30 in FIG. 1. The mounting bracket 200 includes a tubular sleeve 201 that is integrally formed between a first tab member 202 and a second tab member 203. The first and second tab members 202 and 203 include apertures 204 and 205 that are axially aligned with the centerline of the tubular sleeve 201. A first leg portion 206 is integrally connected to the first tab member 202. A second leg portion 207 is integrally connected to the second tab member 203. A first tab support member 208a and a second tab member 208b (shown in FIG. 18) are integrally formed to the first tab member 202. A third tab member 209a and a fourth tab member 209b (shown in FIG. 18) are integrally formed to the second tab member 203. The first leg member 206 and the second leg member 207 are contoured for receiving the outer surface (i.e., profile) of the tubular member 16 (shown in FIG. 1). The tab support members 208a, 208b, 209a, and 209b also receive the tubular support member and provide structural support for the mounting bracket 200.

Figure 18:
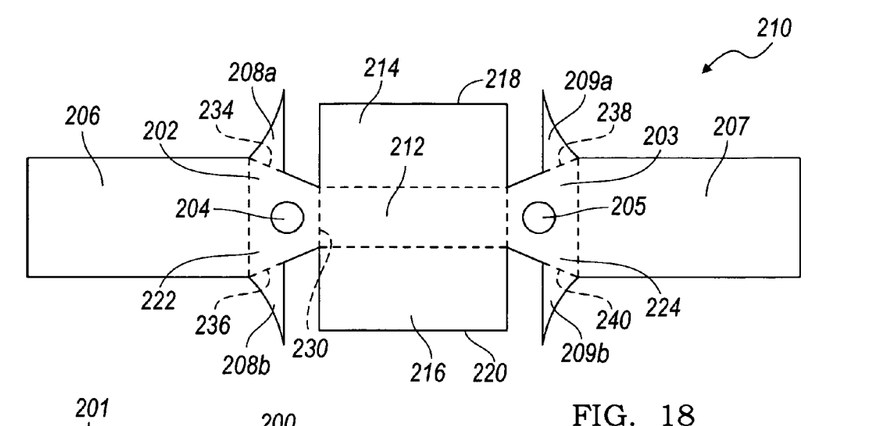
FIG. 18 is a plan view of a blank used for forming the mounting bracket of FIG. 16 according to the seventh preferred embodiment of the present invention.

A stamped one-piece integral metal blank 210, as shown in FIG. 18, is used to form the mounting bracket 200 as shown in FIGS. 16 and 17. The one-piece blank 210 includes a main body portion 212 having the first tab member 202 and the second tab member 203 extending outwardly from opposing sides of the main body portion 212. The first tab member 202 is symmetrical to the second tab member 203. The main body portion 212 includes opposing ends 214 and 216 that are symmetrical to one another. The first leg portion 206 is integrally formed to the first tab member 202. The first and second support members 208a and 208b are integral to the first tab member 202 and extend laterally from opposing sides. The second leg member 207 is integrally formed to the second tab member 203. The third and fourth tab support members 209a and 209b are integral to the second tab member 203 and extend laterally from opposing sides.

The first leg portion 206 is asymmetrical to the second leg portion 207. Preferably, the one-piece blank 210, including the apertures 204 and 205, is formed during a one-step processing operation. Alternatively, the one-piece blank 210 may be initially formed and apertures 204 and 205 may be stamped thereafter.

Referring now to FIGS. 16 and 17 with reference to FIG. 18, the mounting bracket 200 is formed from the one-piece integral blank 210 shown in FIG. 18. To form the mounting bracket 200, opposed ends 214 and 216 of the main body portion 212 are folded in a generally circular manner and adjoined at edges 218 and 220 to form the tubular sleeve 201. The first tab member 202 and the second tab member 203 include abutment surfaces 222 and 224, respectively, for abutting tubular sleeve ends 226 and 228. The first and second tab members 202 and 203 are folded along fold lines 230 and 232, respectively, at substantially right angles until abutment surfaces 222 and 224 abut tubular ends 226 and 228, respectively. When the abutment surfaces 222 and 224 are in contact with tubular ends 226 and 228, respectively, apertures 204 and 205 are axially aligned with the bore of the tubular sleeve 201.

The first and third support members 208a and 209a are folded along fold lines 234 and 238, respectively, to substantially 90 degrees so that the first and third support member 208a and 209a are substantially planar to one another. Similarly, the second and fourth support members 208b and 209b are folded along fold lines 236 and 240, respectively, to substantially 90 degrees so that the second and fourth support member 208b and 209b are substantially planar to one another.

The first leg portion 206 and the second leg portion 207 are bent to form a substantially semi-circular mounting surface. The combined shape of the first leg portion 206 and the second leg portion 207 form the substantially semi circular mounting surface that conforms to the outer surface of a tubular housing 16 (shown in FIG. 1). The support members 208a-b and 209a-b in cooperation with the contoured leg portions 206 and 207 box in a portion of the attaching surface region of the tubular member 16 for structural support.

As described earlier, the first leg portion 206 and second leg portion 207 are asymmetrical to one another. This allows the mounting bracket 200 to be attached to a vehicle frame or unibody in those locations in which a centered mounted bracket would have difficulties attaching thereto. Alternatively, the leg portions may be symmetrical.

Figure 19:
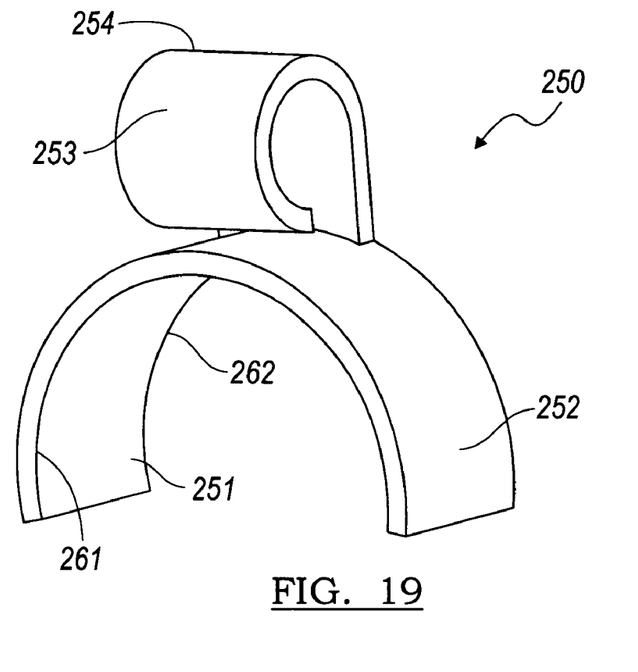
FIG. 19 is a perspective view of a mounting bracket according to an eighth preferred embodiment of the present invention.

FIG. 19 illustrates an eighth preferred embodiment of a mounting bracket 250 according to the present invention. The mounting bracket 250 can be used in place of mounting bracket 30 in FIG. 1. The mounting bracket 250 includes a first leg portion 251 and a second leg portion 252 that are contoured for attaching to an outer surface of the tubular housing 16 (shown in FIG. 1). The mounting bracket 250 further includes a tubular sleeve 253 that is integrally formed by a third leg portion 254.

Figure 20:
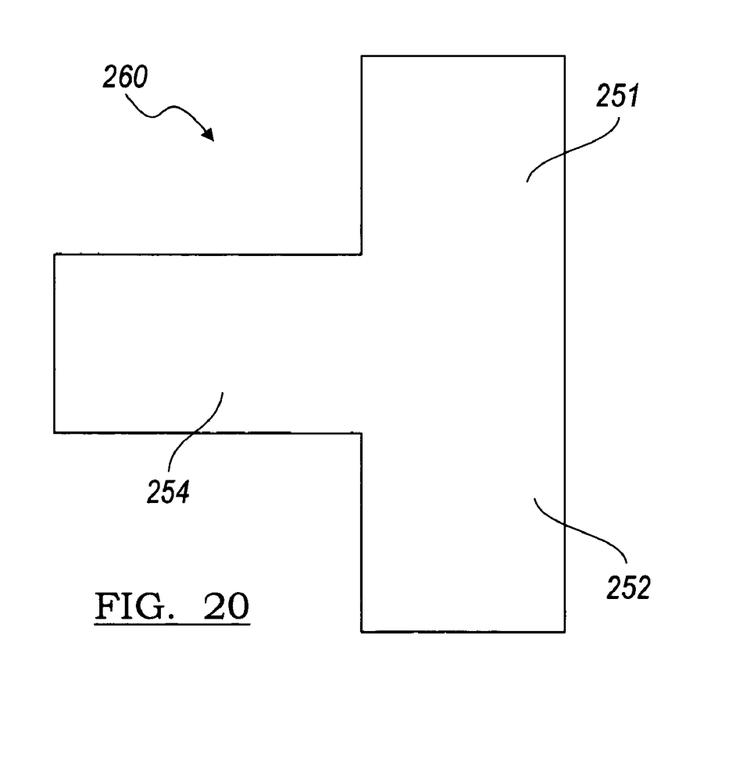
FIG. 20 is a plan view of a blank used for forming the mounting bracket of FIG. 19 according to the eighth preferred embodiment of the present invention.

A stamped one-piece integral blank 260, as shown in FIG. 20, is used to form the bracket 250 of FIG. 19. The one-piece blank 260 is T-shaped and includes the first leg portion 251, the second leg portion 252, and the third leg portion 254. The first leg portion 251 and the second leg portion 252 are preferably symmetrical to one another. The third leg portion 254 is formed at an equal distance between the first leg portion 251 and the second leg portion 252 and extends substantially at a right angle from both the first leg portion 251 and second leg portion 252. Alternatively the third leg portion 254 may be formed offset between the first leg portion 251 and the second leg portion 252.

Referring now to FIG. 19 with reference to FIG. 20, the mounting bracket 250 is formed from the one-piece integral blank 260 shown in FIG. 20. To form the mounting bracket 250 from the one-piece integral blank 260, the first leg portion 251 and the second leg portion 252 are bent to form a substantially semi-circular mounting surface. The combined shape of the first leg portion 251 and the second leg portion 252 form the substantially semi-circular mounting surface that conforms to the outer surface of a tubular housing 16 (shown in FIG. 1). The third leg portion 254 is folded to form a tubular sleeve 253 for receiving a fastener shaft (not shown) such as a bolt shaft. The substantially semi-circular mounting surface is affixed to the tubular housing 16 preferably by a welding process along mounting bracket edges 261 and 262.

From the foregoing description, one of ordinary skill in the art can easily ascertain the essential characteristics of this invention and, without departing from the spirit and scope thereof, can make various changes and modifications to the invention to adapt it to various usages and conditions. For example, each of the above referenced embodiments are stamped, formed, and folded to produce the a respective mounting bracket; alternatively, portions of the bracket such as legs, tab members, support members, or sleeve ends may be welded to one another for added stiffness and support.

What is claimed is:

1. A one-piece bracket for mounting a tubular housing of a steering gear tube assembly to a vehicle member, the bracket comprising:
   a main body portion;
   at least one folded portion integral with and extending from said main body portion, said at least one folded portion forming a sleeve having an axis extending longitudinally therethrough, said sleeve adapted for receiving a fastening member along said axis for coupling said bracket to said vehicle member;
   a first leg portion integral with and extending from said main body portion, said first leg portion is contoured for being adapted to be coupled to said tubular housing;
   a second leg portion integral with and extending from said main body portion, said second leg portion is contoured for being adapted to be coupled to said tubular housing, said first and second leg portions being apart a predetermined distance defining an opening therebetween for receiving said tubular housing;
   a first tab member including an aperture; and
   a second tab member including an aperture;
   wherein said aperture of said first tab member and said aperture of said second tab member are axially aligned with said sleeve for receiving said fastening member therethrough, and wherein said sleeve provides structural support for preventing said first and second tab members from collapsing when said fastening member is inserted through said first tab member, said sleeve, and said second tab member for fastening to said vehicle member.

2. The one-piece bracket of claim 1 wherein said first leg portion includes a hole therethrough aligned with said receiving member and adapted for receiving said fastening member therethrough.

3. The one-piece bracket of claim 1 wherein said second leg portion includes a hole therethrough aligned with said receiving member and adapted for receiving said fastening member therethrough.

4. The one-piece bracket of claim 1 wherein said first and second leg portions are adapted to be affixed to said tubular housing by welding.

5. The one-piece bracket of claim 1 further comprising at least one integral support member for providing structural support to said first leg portion and said second leg portion when adapting to said tubular housing, said at least one support member and said first and second leg portions enclosing a portion of said tubular housing.

6. The one-piece bracket of claim 1 wherein a portion of said first leg portion is contoured for adapting to a shape of an exterior surface of said tubular housing for coupling to said tubular housing.

7. The one-piece bracket of claim 1 wherein a portion of said second leg portion is contoured for adapting to a shape of an exterior surface of said tubular housing for coupling to said tubular housing.

8. The one-piece bracket of claim 1 wherein said first and second leg portions extend equal lengths from said folded portion for adapting to said tubular housing.

9. The one-piece bracket of claim 1 wherein said first leg portion includes an end portion spaced from said main body portion and adapted to be coupled to said tubular housing.

10. The one-piece bracket of claim 1 wherein said second leg portion includes an end portion spaced from said main body portion and adapted to be coupled to said tubular housing.

11. The one-piece bracket of claim 1 further comprising an integral support member for providing structural support to said sleeve.

12. The one piece bracket of claim 1 further comprising at least one support member for providing structural support to said bracket.

13. The one piece bracket of claim 12 wherein said at least one support member is integral to said tab member.

14. The one piece bracket of claim 13 wherein said at least one support member in cooperation with said at least one tab member encloses a region of an outer surface of said tubular housing.

15. The one piece bracket of claim 12 wherein said at least one support member conforms to a contour shape of an outer surface region of said tubular housing.

16. The one piece bracket of claim 1 wherein said first leg member and said second leg member include apertures for receiving said fastening member.

17. The one-piece bracket of claim 1 further comprising a first tab member including an aperture therethrough aligned with said longitudinal axis of said sleeve and adapted for receiving said fastening member therethrough.

18. The one-piece bracket of claim 17 further comprising a second tab member including an aperture therethrough aligned with said longitudinal axis of said sleeve and adapted for receiving said fastening member therethrough.

19. The one piece bracket of claim 1 further comprising a first support member integral only with and extending from said main body portion for providing structural support to said first and second leg portions.

20. The one piece bracket of claim 19 further comprising a second support member integral only with and extending from said first leg portion and a third support member integral only with and extending from said second leg portion.

21. The one piece bracket of claim 20 wherein said first, second, and third support members in cooperation with said first and second leg portions enclose a region of an outer surface of said tubular housing.

22. The one piece bracket of claim 20 wherein said support members conform to a contour shape of an outer surface region of said tubular housing.

23. A one-piece bracket for mounting a tubular housing of a steering gear tube assembly to a vehicle member, the bracket comprising:
- a main body portion;
- at least one folded portion integral with and extending from said main body portion, said at least one folded portion forming at least one tubular receiving member having an axis extending longitudinally therethrough, said tubular receiving member adapted for receiving a fastening member along said axis for coupling said bracket to said vehicle member;
- a first leg portion integral with and extending from said main body portion, said first leg portion contoured for being coupled to said tubular housing; and
- a second leg portion integral with and extending from said main body portion, said second leg portion contoured for being coupled to said tubular housing;
- a first tab member including a first aperture axially aligned with said longitudinal axis of said tubular receiving member and adapted for receiving said fastener;
- a second tab member including a second aperture axially aligned with said longitudinal axis of said tubular receiving member and adapted for receiving said fastener, said sleeve providing structural support for preventing said first and second tab members from collapsing when said fastening member is inserted through said first tab member, said sleeve, and said second tab member for fastening to said vehicle member;
- said first tab member further including an at least one support member, said second tab member further including at least one support member, wherein said support members cooperatively provide structural support to said bracket;
- wherein said first and second leg portions are spaced apart a predetermined distance defining an opening therebetween adapted to receive said tubular housing.

\* \* \* \* \*

UNITED STATES PATENT AND TRADEMARK OFFICE
CERTIFICATE OF CORRECTION

PATENT NO. : 7,481,401 B2 Page 1 of 1
APPLICATION NO. : 11/209840
DATED : January 27, 2009
INVENTOR(S) : C. Renee Hyslop et al.

It is certified that error appears in the above-identified patent and that said Letters Patent is hereby corrected as shown below:

Column 11, Claim 1, line 50, after "being" insert --spaced--.

Signed and Sealed this

Seventeenth Day of March, 2009

JOHN DOLL
*Acting Director of the United States Patent and Trademark Office*